Oct. 16, 1945.                R. BLAGDEN                2,386,836
CARGO TIE-DOWN FITTING
Filed March 19, 1943

Rudolph Blagden INVENTOR.
BY
His Patent Attorney

Patented Oct. 16, 1945

2,386,836

UNITED STATES PATENT OFFICE 2,386,836

CARGO TIE-DOWN FITTING

Rudolph Blagden, Kenmore, N. Y., assignor to Curtiss-Wright Corporation, a corporation of Delaware Application March 19, 1943, Serial No. 479,753

2 Claims. (Cl. 248—361)

The present invention relates to an improved fitting for the fastening or lashing of cargo and freight and more particularly to a combined hook and cleat tie-down fitting for lashing cargo and freight in cargo aircraft, ships, railroad cars and other vehicles.

Numerous devices and methods have heretofore been suggested and used for fastening or securing cargo and freight to the deck or floor of ships and vehicles. Few of these devices which have proven safe and secure in other means of transportation have, however, been adapted for use in aircraft where considerations of weight, speed of attachment, and security against loosening and damage due to vibration and change of attitude and position of the aircraft are of vital importance.

The present invention comprises essentially a tie-down fitting particularly adapted for use in lashing down cargo or other heavy items in aircraft and other vehicles. The present fitting comprises essentially a single device having a cable or rope terminal eye, an oppositely disposed hook for engaging an eye fixed to the floor, deck or other support, and a cleat disposed adjacent and intermediate the hook and eye. The arrangement is such that a strand of rope, having a terminal spliced or fixed to the eye of the fitting, can be extended around a projected portion of the item to be lashed and returned to the cleat where it is adjustably tied, developing suitable tension against the eye and the engaging hook to thereby lash the cargo to the fixed point upon the floor or deck.

It is accordingly a primary object of the present invention to provide a tie-down fitting comprising in a single device, a hook, an eye and a pair of extended arms forming a cleat. It is a further object to provide in such a combination fitting, a unique arrangement of the hook, eye and cleat portions such that when a rope or cable is fastened to the eye portion it forms therewith a means for simply, safely and rapidly securing the cargo or freight item to a fixed part of the vehicle in which the cargo is being transported.

It is also an object of this invention to provide a hook and cleat tie-down fitting for lashing down heavy items to prevent any shifting or movement thereof and to make the operation as simple and as fast as possible, both in the fastening and unfastening procedures and still to prevent the least amount of slippage without the use of difficult knots or other auxiliary fastening devices. It is a further object to provide such a combined fitting to which a strand of rope or cable is permanently attached to an eye portion such that it is readily available for use in the transporting vehicle.

Other objects and advantages of the present invention, both with respect to its general arrangement, detailed form and use, will become apparent to those skilled in the art after reading the present specification and the attached drawing forming a part hereof, in which.

Figure 1:
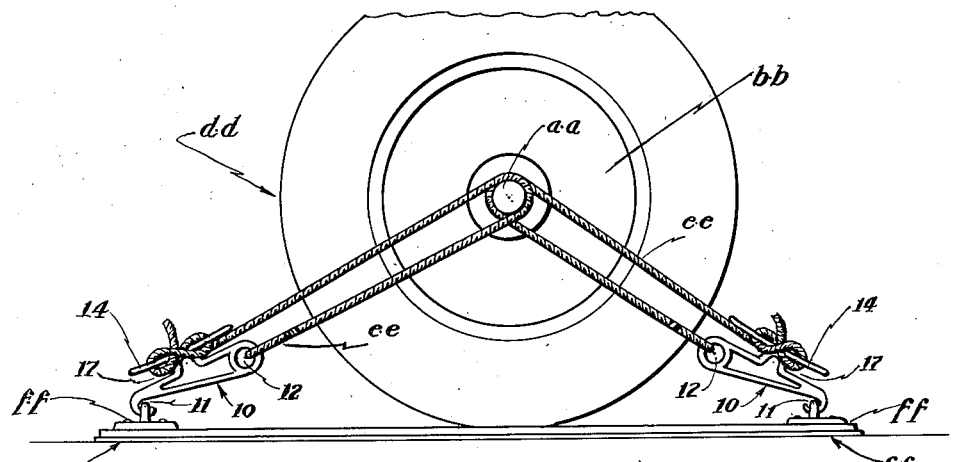
Fig. 1 is a side view illustrating a preferred form of the present fitting in fastening a circular or cylindrical object to the floor or other support.

Referring now to Fig. 1, there is shown a preferred method of tying down a circular or cylindrical object $dd$ which may be the wheel $bb$ of a vehicle desired to be anchored or fastened with respect to the floor $cc$ of a cargo aircraft, or other vehicle. Two hook, eye and cleat tie-down fittings 10 are oppositely disposed with respect to the projecting hub or shaft $aa$ which may either be a part of the wheel $bb$ of the vehicle or a rigid attachment thereto. The upper portion 10A of the tie-down fitting 10 is provided with a pair of arms 14 extending in opposite directions in the same general plane as the remainder of the fitting, to form a rope or cable cleat portion. These arms 14 are inclined upwardly and outwardly in an arc of relatively long radius from the central axis A—A of the fitting.

The arms 14 are of rounded cross-section, the under surface portions 16 being substantially semi-circular and the outer portion 10A being somewhat more flat. The oppositely extending arms forming the cleat portions 14 each form with the opposed portion 10e and 10f of the main cleat body gradually tapering recesses terminating in rounded or semi-circular throat portions 17. A strand of rope, cable or the like $ee$ is spliced or fixed to an eye portion 12 to become a permanent assembly with the tie-down fitting, the rope being of a suitable length for the expected usage such that its free end may be returned from its embracing position with the cargo item with sufficient remaining length to permit its being tied to the cleat portions 14 of the fitting. The free end of the rope ee is passed around the cleat portions and through the recesses 17 to form a half-hitch, or other suitable securing method or knot. The floor or deck cc is preferably provided with an eye fitting ff having a suitably flanged portion which is securely attached to the floor. Similarly, the procedure of securing the cleat fitting 10 to an oppositely disposed eye fitting ff, secured to the floor cc, or other support, is carried out with the rope ee attached to the eye 12 by extending the same around projecting portion aa of item bb to be lashed, and thence returned to the cleat fitting 10 to be suitably tied or secured by creating the tension necessary to securely lash the object from the two opposite points.

Figure 2:
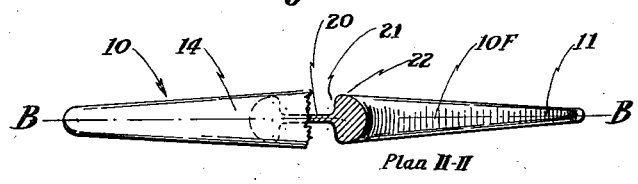
Fig. 2 is a part-sectional plan view of the cleat fitting taken along the lines II—II of Fig. 4.
Figures 3, 4, 5:
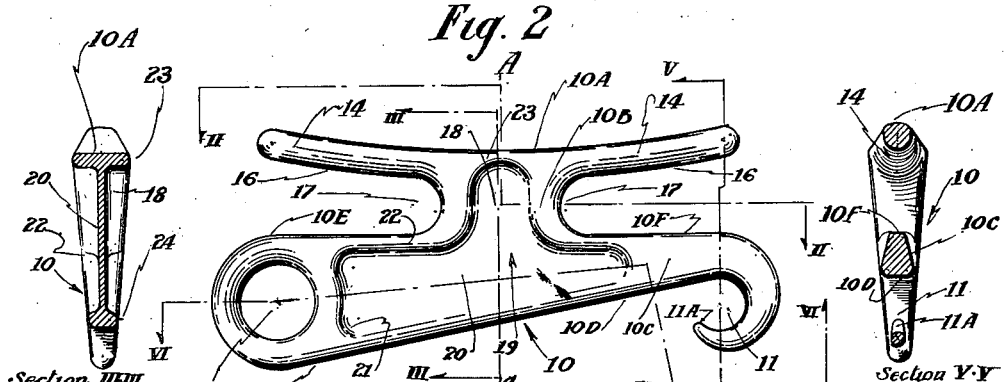
Fig. 3 is a vertical section taken along the lines III—III of Fig. 4.
Fig. 4 is a detailed side view of the preferred form of the cleat fitting.
Fig. 5 is a vertical section taken along the lines V—V of Fig. 4.
Figure 6:
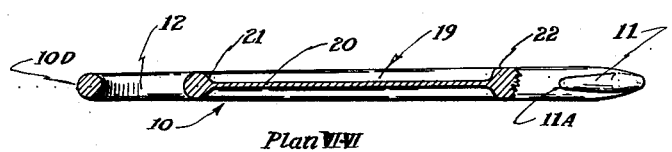
Fig. 6 is a sectional plan view taken along the lines VI—VI of Fig. 4.

Referring to Figs. 2 to 6, inclusive, there is indicated on a much larger scale the hook and eye tiedown fitting 10. In Fig. 4 there is shown a side elevation of the cleat fitting 10 with an upper flattened portion 10A forming the cleat 14, a central throat portion 10B, and a lower body portion 10C, comprising a rope terminal eye 12 and an oppositely disposed hook 11, adapted for engagement with an eye fitting ff secured to a floor cc, or other support. This hook 11 of the cleat fitting 10 is a rounded section which gradually tapers from the hook terminal 11A upwardly in an arcuate direction, forming the hook 11 and merging in a larger section, with the rounded lower edge 10D and the rounded upper edge 10F of the body portion 10C. The rounded lower edge 10D continues downwardly to the left toward the oppositely disposed eye 12 tapering to a slightly smaller cross-sectional dimension, as shown in Fig. 6, and radially turning upwardly in a semicircular direction to merge with the rounded upper edge 10E to form the eye 12. The upper rounded edge 10E at the eye 12 and the upper rounded edge 10F at the oppositely disposed hook 11 extend oppositely in alinement toward the central throat portion 10B of the cleat fitting; these edges then extend upwardly in a semi-circle at the throat and merge with the oppositely disposed extended arms 14 which comprise the cleat portion of the fitting.

These arms 14 are inclined upwardly and oppositely in an arc from the central axis A—A at the upper flattened portion 10A of the cleat fitting 10. The under surfaces 16 of the arms 14 are inclined downwardly and inwardly toward the throat portion 10B and in cooperation with the semi-circular merging connections to rounded edges 10E and opposite rounded edges 10F form tapering recesses 17 completing the cleat in which the rope ee can be wound and adjustably fastened. Intermediate the hook 11 and the eye 12 and proceeding upward to a semi-circular portion 18 through the central portion 10B of the cleat fitting 10 there is formed depressed panels 19 on each side of the light section or web 20, being also defined by the reverse curve 21 adjacent the eye 12 and 22 adjacent to the wider sections under the cleat portion.

Referring now to Fig. 2, there is shown a split plan view II—II at the left side of which the extended arm 14 is shown to taper horizontally to a smaller dimension at its rounded terminal. At the right side of the plan there is shown the upper rounded edge 10F, of the lower jaw of the cleat throat, which also tapers to a smaller dimension at the hook end beyond the bottom portion 10C of the cleat fitting. In Fig. 3 the vertical section III—III shows the widest dimension of the T-flange 23 at the vertical central axis A—A along the upper portion 10A, tapering gradually downwardly to the narrower more bulbous portion 24 at the bottom edge 10D of the cleat fitting.

Referring now to Fig. 5, in which there is shown a vertical cross-section taken through the center of the hook portion 11 and the tip of the adjacent cleat arm 14, it will be noted that the cross section of the hook adjacent its tip portion 11A is substantially circular; and the section where the hook merges with the body portion 10C is somewhat bluntly wedge-shaped having its greater width merging with the lower edge 10D and having its lesser width merging into the flat lower jaw edge 10F of the cleat throat. This section as it cuts through the terminal portion of the cleat arm 14 reveals that the upper portion 10A is but slightly rounded, being an arc of a relatively long radius to permit its merging with the flat portion at 23 and its lower surface is substantially semi-circular to permit its following the semi-circular curvature of the lower surface 16 into the rounded throat portion at 17.

The novel form and cross-sectional shape of the present cleat fitting has contributed materially to its high strength-to-weight ratio and its satisfactory use under difficult service conditions. The fitting may be cast, preferably of steel or a steel alloy such as chrome-nickel-molybdenum combinations but may also be made as a forging or by other suitable processes depending upon the use for which it is intended. It will be noted that for a relatively light fitting those surfaces about which the rope or cable are likely to be lashed and drawn are curved to relatively large radii, the horizontal cross-section through the throat of the cleat taking the form of a dumb-bell shape, as may be clearly seen in Fig. 2, about which the rope may be lashed in a half-hitch or figure 8 pattern. Similarly, it will be noted that the vertical cross-section taken along the lines III—III, as shown in Fig. 3, reveals a T-shaped cross-section having an upper flanged portion at 23, a relatively deep but thin web portion 20 and a bulbous stiffening portion 24 which gives the fitting a relatively high resistance to bending across its central portion. The latter bulbous portion also assists the web 20 in transmitting the high tensile forces exerted between the hook 11 and the eye 12.

In general appearance it will be noted that looking downwardly upon the cleat arms the fitting has a flattened lozenge or diamond shape; when viewed from either end it is substantially wedge-shaped with its narrower edge pointing downwardly toward the hook and eye portions, and the general thickness through its lower body portion between the hook and eye terminals is substantially planar and of the same thickness with a relatively slight taper from the hook to the eye portion, and with a somewhat greater taper downwardly from the cleat to the latter portions.

Other forms of the present invention both with respect to its general arrangement and the details of its respective parts which may become apparent to those skilled in the art after reading the present disclosure are intended to come within the scope of the present invention as more specifically defined in the appended claims.

I claim:

1. A cargo tie-down set of the class described comprising a rigid elongated body of substantially planar form comprising an eye terminal, an open hook terminal and a cleat portion extending from a central throat portion of said body, said cleat having oppositely extending arms spatially terminating adjacent said eye and hook portions, the said hook opening facing toward the said central throat portion and accessible from the side of the fitting opposite the said cleat, the arrangement of said attachment portions being such that a line extending along the said side of the fitting converges with a line extending through the arms of said cleat when projected in the direction of said open hook terminal, each of the cross sections taken through said body normal to said cleat and along the lines connecting the said hook and eye portions being of an I-beam cross section to resist bending developed in said fitting as a result of loads applied at said attachment portions and a rope-like element having a terminal permanently attached to the said eye portion of said fitting, a further portion of said rope-like element in engagement with a cargo item and a further portion of said rope-like element in the region of its opposite terminal adapted for detachable fastening to the said cleat portion of said fitting.

2. A cargo tie-down assembly for aircraft for detachably securing a cargo item disposed between spaced apart anchoring devices in an aircraft floor comprising a pair of tie-down sets each consisting of a unitary tie-down fitting, said fitting having a hook terminal engageable with one of said anchoring devices, said fitting having integral eye and cleat portions, and a flexible elongated securing element having one of its terminals permanently attached to the said eye portion of said fitting whereby each said tie-down set is adapted upon engagement of the said hook portion of its fitting with one of said anchoring devices to have its flexible securing element encompassingly engage a portion of said cargo item and to have the return portion of said securing element releasably attached to the said cleat portion of said fitting for the quickly detachable securement of said cargo item to said anchoring devices and the floor of said aircraft.

RUDOLPH BLAGDEN.